United States Patent [19]
Bachle et al.

[11] 3,710,158
[45] Jan. 9, 1973

[54] ALTERNATING CURRENT GENERATOR WITH RADIAL STATOR POLES

[75] Inventors: Karl Bachle, Stetten; Ludwig Finkbeiner, Walheim; Bernd Taubitz, Pforzheim, all of Germany

[73] Assignee: Robert Bosch GmbH, Stuttgart, Germany

[22] Filed: Nov. 1, 1971

[21] Appl. No.: 194,370

[30] Foreign Application Priority Data

Oct. 30, 1970   Germany.....................P 20 53 262.1

[52] U.S. Cl. ...................310/156, 310/67, 310/168
[51] Int. Cl. .............................................H02k 21/12
[58] Field of Search..........310/67, 156, 168, 169, 46, 310/268

[56] References Cited

UNITED STATES PATENTS

| | | | |
|---|---|---|---|
| 3,652,887 | 3/1972 | Taubitz | 310/168 |
| 3,596,122 | 7/1971 | Stewart | 310/67 |
| 3,549,925 | 12/1970 | Johnson | 310/168 |
| 3,534,204 | 10/1970 | Groezinger | 310/67 X |
| 3,253,170 | 5/1966 | Phillips et al. | 310/168 |
| 3,233,132 | 2/1966 | Terry et al. | 310/168 |
| 3,218,494 | 11/1965 | Bacon et al. | 310/156 |
| 3,193,713 | 7/1965 | Larson et al. | 310/168 |

FOREIGN PATENTS OR APPLICATIONS

| | | | |
|---|---|---|---|
| 628,763 | 9/1949 | Great Britain | 310/156 |

*Primary Examiner*—D. F. Duggan
*Attorney*—Michael S. Striker

[57] ABSTRACT

An alternating current generator has a rotor with a circular row of permanent magnetic poles which are alternately of opposite polarity, and a stator with U-shaped stator poles whose legs project in radial direction toward the rotor poles. The legs of each stator pole have circumferentially and axially spaced end portions located opposite two adjacent rotor poles of opposite polarity, respectively. An annular stator winding is located within the open annular space formed by the U-shaped stator poles.

23 Claims, 15 Drawing Figures

ALTERNATING CURRENT GENERATOR WITH RADIAL STATOR POLES

BACKGROUND OF THE INVENTION

The present invention is concerned with an alternating current generator which is particularly suited for measuring rotary speeds in the transfer blocking system of a vehicle brake system. Generators serving this purpose are known which have a rotor whose surface confronting the stator consists of a permanently magnetic material forming strip-shaped rotor poles whose polarity alternates. The stator is provided with an annular stator winding with stator poles consisting of a magnetizable material.

A synchronous motor is known which has a set of stator poles comprising two stator pole sheets located on opposite sides of the stator winding and having inwardly bent stator poles at the outer end. The stator poles are arranged so that each stator pole on one side of the stator winding is located between two stator poles on the other side of the winding. The stator poles on one side of the stator windings are located opposite south poles of the rotor when the stator poles on the other side of the winding are located opposite north poles of the rotor. During rotation of the rotor for one pole distance, the direction of the magnetic flux is reversed in the stator.

This known generator can only be used if the rotor surrounds the stator. For certain tests on wheels of a vehicle provided with a brake, alternating current generators with outside rotor or inside rotor are required, depending on whether the rotary speed of a driven or of a freely rotatable wheel is to be measured. Furthermore, it is desirable that the rotor diameter corresponds to the diameter of a drive shaft.

It is therefore one object of the invention to provide an alternating current generator which is provided with rotors having very different diameters.

Another object of the invention is to use identical parts for the construction of generators with outside rotors, and generators with inside rotors.

SUMMARY OF THE INVENTION

The objects of the invention are obtained in a simple manner by providing a stator with an annular supporting body carrying U-shaped magnetizable stator poles having two end portions respectively located opposite permanently magnetic rotor poles of opposite polarity.

In some embodiments of the invention, the rotor is surrounded by the stator, and in other embodiments, the stator is surrounded by the rotor. Irrespective of the selected arrangement of the stator and rotor, the same U-shaped stator poles, annular supporting body, and annular stator winding can be used.

An embodiment of the invention comprises a rotor having a circumferential circular rotor surface made of a permanently magnetic material and forming circumferentially alternating magnetic rotor poles of opposite polarity; and a stator including a circular supporting body, preferably consisting of a synthetic plastic material, an annular winding, and a circular row of stator poles mounted on the supporting body radially projecting toward the rotor surface.

Each stator pole consists of a magnetizable material and has two end portions spaced in axial direction and respectively located opposite two rotor poles of opposite polarity. The stator poles are preferably flat U-shaped sheets having a pair of legs with end portions respectively cooperating with two adjacent rotor poles of opposite polarity.

The stator pole may be slightly slanted to axially extending rotor poles, or the rotor poles may be slightly slanted to axially extending stator poles. In some embodiments, the winding is located in the annular space formed by the row of U-shaped stator poles, and in other embodiments the annular supporting body is located in this space, and has a U-shaped cross-section so that the winding can be placed in the annular space formed by the supporting body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1A:
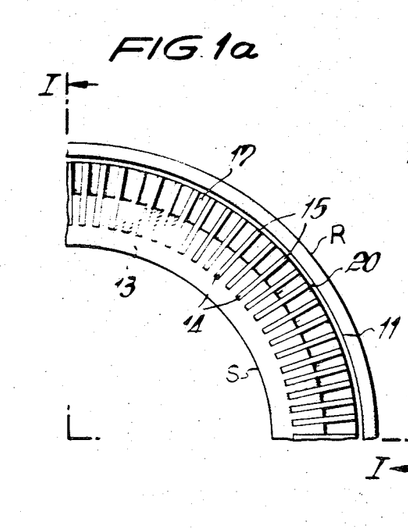
FIGS. 1a and 1b are fragmentary side view and a sectional view along line I—I, respectively, and illustrating a first embodiment of the invention.
Figure 1B:
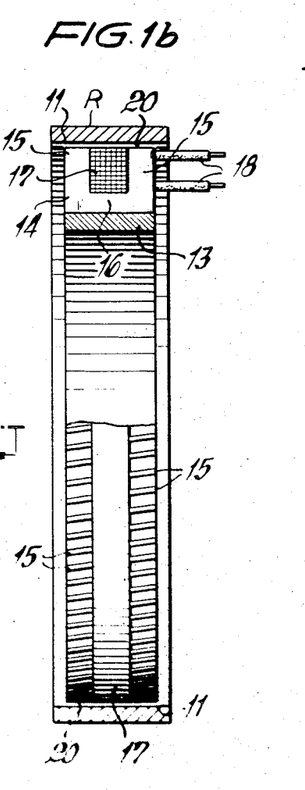
Figure 3:
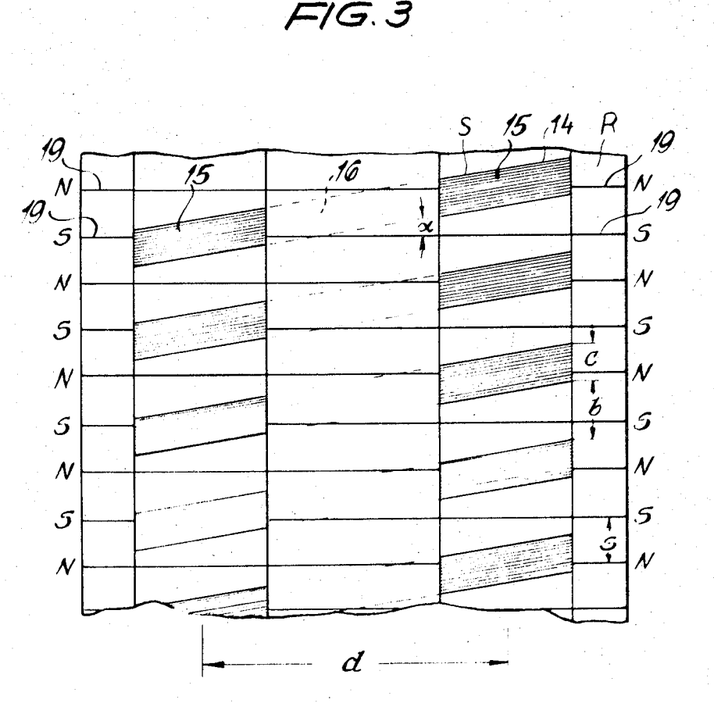
FIG. 3 is a diagrammatic developed view illustrating the relative position of the stator poles and rotor poles in the first and second embodiment of the invention.

Referring to the first embodiment shown in FIGS. 1a and 1b, the circular rotor R which has an inner surface provided with a circular row of circumferentially spaced permanent rotor poles whose polarity alternates. In the preferred embodiment of the invention the rotor R includes an annular support, and a band attached to the annular support and forming a cylindrical ring having the rotor surface 11. The band consists of a permanently magnetizable material in which permanently magnetic rotor poles 19, see FIG. 3, are made in such a manner that alternate rotor poles 19 have opposite polarity. As shown in FIG. 3, the rotor poles 19 are parallel to the axis of the generator. However, it is also possible to slant the narrow axially elongated rotor poles 19 to the direction of the axis.

The stator of the embodiment shown in FIGS. 1a, 1b and 3, includes an annular supporting body 13, a circumferential row of U-shaped stator poles 14, and a stator winding 17 located in an outwardly open annular space formed by the circular row of U-shaped stator poles 14.

Stator poles 14 are flat U-shaped sheets with a yoke portion 16 inserted into corresponding circumferentially spaced grooves in the outer circular surface of supporting body 13, and legs 15 projecting substantially radially toward the inner rotor surface 11, and having end portions forming gaps with the inner rotor surface 11. As shown in FIG. 3, the U-shaped sheets 14, which form the stator poles, are slanted a small angle $\alpha$ to the axial direction and to the parallel rotor poles 19. Consequently, the grooves in the outer surface of supporting body 13, in which the stator poles 14 are respectively located, are also slanted to the axial direction. The output voltage of the stator winding 17 is delivered by two connectors 18.

Referring again to FIG. 3, it will be understood that the magnetic flux through the stator poles 14 will be a maximum when the stator poles 14 are slanted to the axial direction, and to the rotor poles 19, an angle $\alpha$ which can be calculated from the circumferential distance $s$ between two adjacent rotor poles 19, and from the mean distance $d$ between the legs 15 of the stator poles 14 in accordance with the equation tank $\alpha = s/d$. When the angle between the slanted stator poles 15 and the axially extending rotor poles 19 is determined in this manner, each leg 15 is located opposite a north pole while the respective other leg 15 of the same stator pole 14 is located opposite a south pole of the rotor poles 19.

It is apparent from FIG. 3 that the function of the generator would not be any different, if the flat U-shaped stator poles 14 with legs 15 would be arranged parallel to the axis of the generator, while the rotor poles 19 would be slanted the angle $\alpha$ to the axial direction, and to the stator poles. The distance of stator poles 14, 15 is designated $b$, and the thickness of the stator pole sheets 14 is designated $c$ in FIG. 3.

It will be apparent that during rotation of rotor R, permanently magnetic rotor poles of opposite polarity alternately pass the ends of the stator poles 14, 15 so that flux variations are produced in the U-shaped stator poles 14, 15 which induce an alternating current in the winding 17.

Figure 2A:
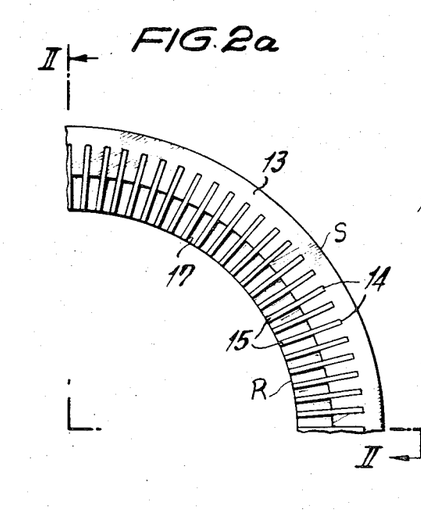
FIG. 2a and FIG. 2b are a fragmentary side view and a sectional view along line II—II, and illustrating a second embodiment.
Figure 2B:
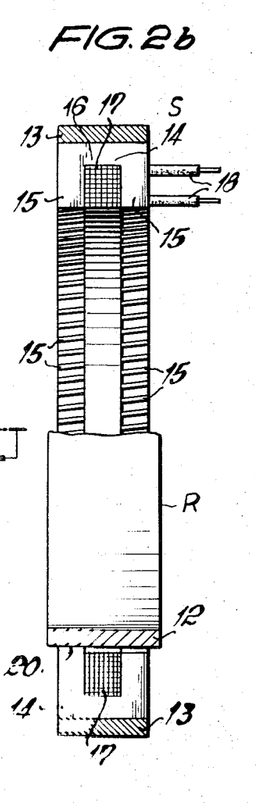

Referring now to the second embodiment illustrated in FIGS. 2a and 2b, the arrangement is a reversal of the arrangement of the first embodiment of the invention. The rotor R is arranged within the annular stator S, and the outer circular surface 12 of rotor R is provided with circumferentially spaced rotor poles 19. The stator includes an annular supporting body 13, whose inner circular surface is provided with slanted grooves, in which the yokes 16 of U-shaped stator poles 14 with legs 15 are mounted. The end portions of legs 15 form the gap 20 with the outer rotor surface 12. The winding 17 is located in the annular space formed between the yoke 16 and the legs 15 of the circumferential row of radially inward projecting stator poles 14.

The embodiment of FIGS. 2a and 2b is particularly suited for measuring the rotary speed of driven wheels, since the inner rotor R can be easily secured to the drive shaft.

The schematic diagram of FIG. 3 is also applicable to the embodiment of FIGS. 2a and 2b. It will be noted that in the first embodiment of FIGS. 1a and 1b, and in the second embodiment of FIGS. 2a and 2b, identical stator pole sheets 14, and identical windings 17 can be used, which reduces manufacturing and storing expenses.

Figure 4A:
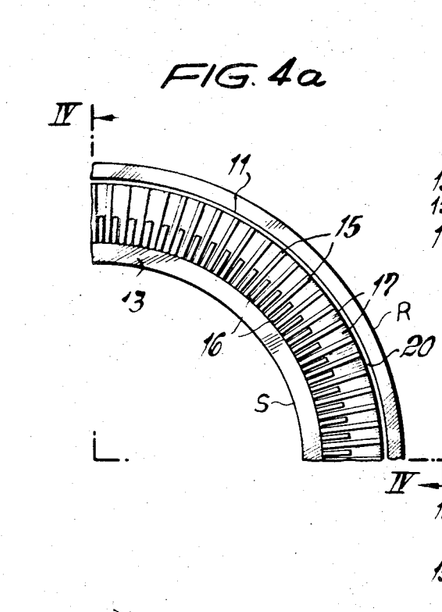
FIG. 4a and FIG. 4b are a fragmentary side view, and a sectional view on line VI—VI, respectively, illustrating a third embodiment of the invention.
Figure 4B:
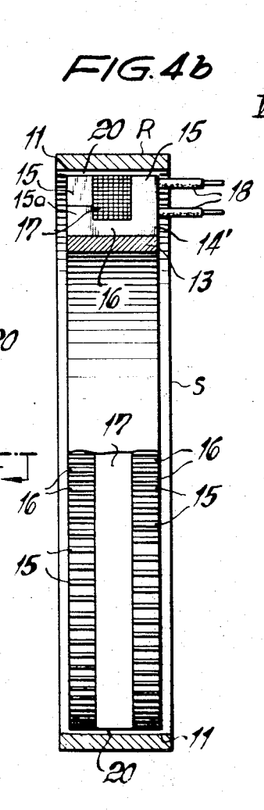
Figure 6:
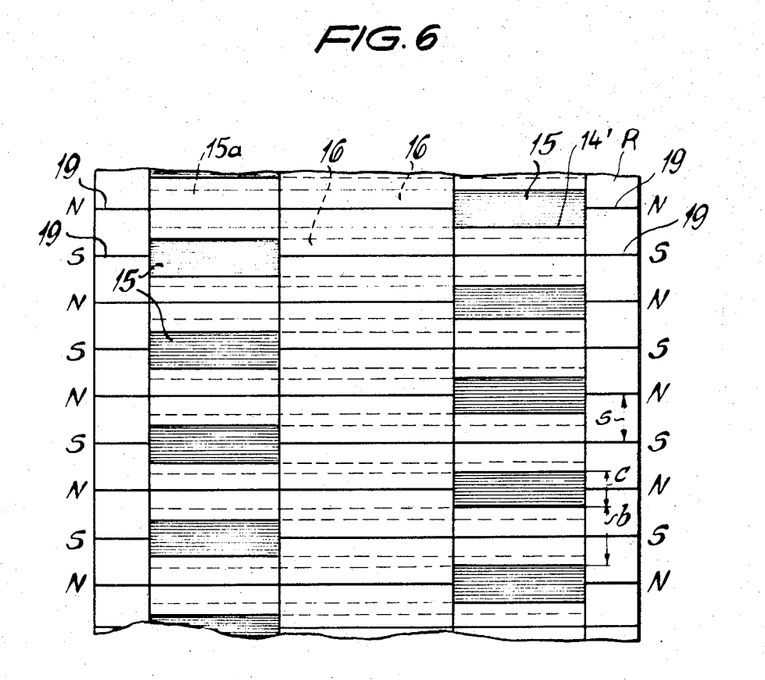
FIG. 6 is a diagrammatic developed view illustrating the relative position of the rotor poles and stator poles in the third and fourth embodiments.

The third embodiment shown in FIGS. 4a and 4b, has again an outer rotor R surrounding the inner stator S, and the arrangement corresponds to the construction of the first embodiment. However, each U-shaped stator pole 14' consists of two overlapping laterally abutting L-shaped sheets having long legs 15 and short legs 15a. As best seen in FIG. 6, the thickness of the L-shaped stator pole sheets is somewhat smaller than the distance $s$ of adjacent rotor poles 19, since the center yoke portions 16 of each stator pole 14' abut each other so that the legs 15 are spaced exactly the required circumferential distance $s$ between adjacent rotor poles 19.

In this third embodiment of the invention, the magnetic flux closes from one rotor pole 19 through two L-shaped stator pole sheets to the next following rotor pole 19. As compared with the embodiment of FIGS. 1a and 1b, the embodiment of FIGS. 4a and 4b has the advantage that due to the parallel arrangement of the stator poles 14' and the rotor poles 19, as best seen in FIG. 6, a greater surface of a stator pole 14' is located opposite a rotor pole 19. In this manner, the magnetic resistance of the air gap 20 between the inner rotor surface 11, and the outer stator surface, is reduced.

Figure 5A:
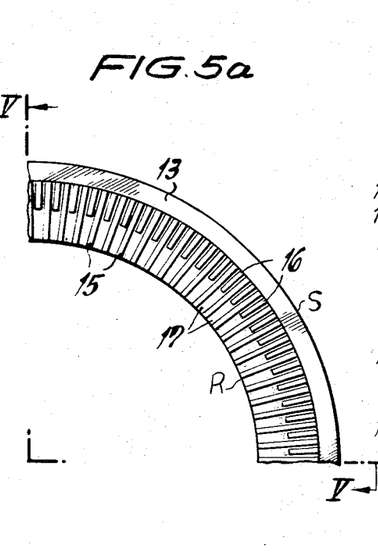
FIG. 5a and FIG. 5b are a fragmentary side view and a sectional view taken on line VIII—VIII, respectively, and illustrating a fourth embodiment of the invention.
Figure 5B:
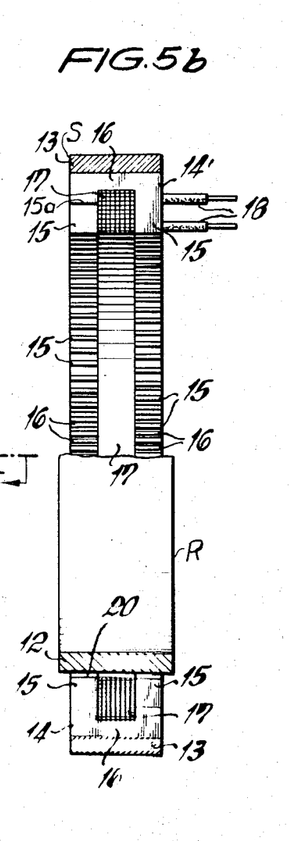

The forth embodiment illustrated in FIGS. 5a and 5b, is a reversal of the third embodiment, and the stator S surrounds the rotor R. The legs 15 and 15a of each of the two L-shaped sheets which together form a stator pole 14', project radially inward toward the outer pole surface 12 of the rotor, forming an air gap 20 with the same. The parallel positions of stator poles 14' mounted in grooves of supporting body 13, and the corresponding parallel positions of the axially extending rotor poles 19, are best seen in FIG. 6.

In the embodiments described with reference to FIGS. 2a and 2b, and 5a, 5b, the assembly of the stator winding is more difficult than in the embodiments of FIGS. 1a, 1b and 4a, 4b. When the rotor R surrounds the stator S, the stator winding 17 is easily wound into the annular space formed by the U-shaped stator poles 14, whereupon the stator S is placed within the rotor R.

When the rotor is located within the stator, it is necessary to wind the stator winding 17 on a circular support, now shown, to the correct dimension, then embedded in silicon caoutchouc, so that it becomes flexible, whereupon the winding 17 is deformed and fitted into the annular space formed by the inwardly projecting legs of the stator poles 14.

Figure 7A:
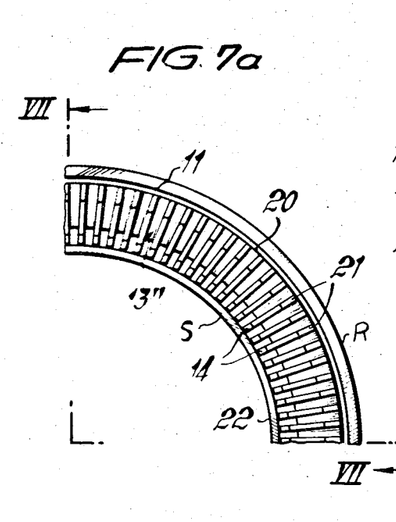
FIG. 7a and FIG. 7b are a fragmentary side view, and a sectional view taken on line IV—IV in FIG. 7a, respectively, and illustrating a fifth embodiment of the invention.
Figure 7B:
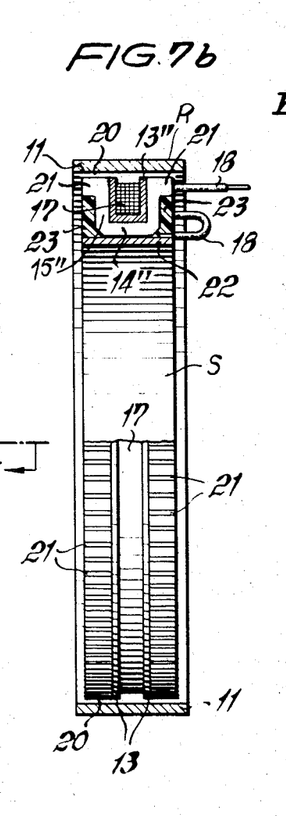

The fifth embodiment illustrated in FIGS. 7a and 7b, has an outer rotor R with an inner pole surface 11, and an inner stator S whose U-shaped stator pole sheets 14'' have narrow legs 15'' ending in larger end portions 21 which extend the entire axial length of the stator S. Due to the larger pole shoe portions 21, the magnetic resistance of the air gap 20 is low. An inner holding ring 22, preferably consisting of an electrically conductive material, not only supports the stator pole 14', but serves also as ground connection for the stator winding 17. The supporting body 13'' has a U-shaped cross section and is located within the annular open space formed by the circular row of U-shaped stator pole sheets 14'. The annular winding 17 is located within the annular space formed by the supporting body 13''.

The lateral annular surfaces of supporting body 13'' have radially extending grooves in which the inner edges of the legs 15'' of stator pole sheets 14'' are mounted, permitting easy radial assembly of the U-shaped stator poles 14'' on the annular supporting body 13''.

Figure 8A:
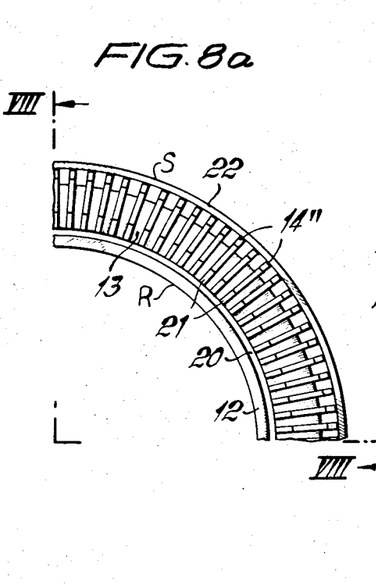
FIG. 8a and FIG. 8b are a fragmentary side view and a sectional view on line X—X, respectively, and illustrating a sixth embodiment of the invention.
Figure 8B:
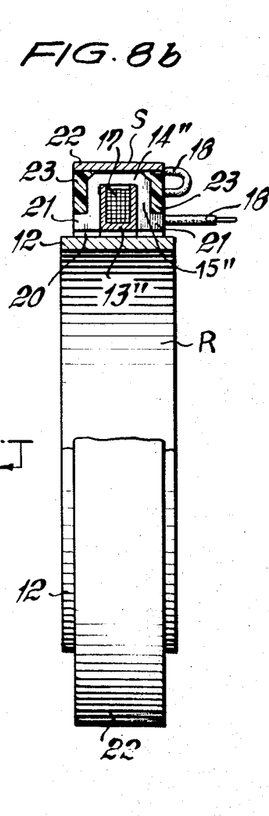

The sixth embodiment shown in FIGS. 8a and 8b has an inner rotor R and an outer rotor S, as described with reference to the embodiment of FIGS. 2a, 2b and 5a, 5b. The stator poles 14'', the supporting body 13'', and the winding 17 are the same as used in the embodiment of FIGS. 7a and 7b so that evidently the fifth and sixth embodiments can be economically manufactured, as required. The embodiment of FIGS. 8a and 8b has the advantage that the stator winding 17 can be wound into the annular space formed by supporting body 13'' before the U-shaped stator poles 14'' are placed on the annular supporting body 13'' guided by the radial grooves in the lateral annular surfaces of supporting body 13''. Finally, the holding ring 22 is axially moved onto the yoke portions of the U-shaped stator poles 14'', and spaced between holding ring 22 and the stator poles 14'' are filled with a synthetic resin, as indicated at 23 in FIGS. 8a, 8b and also in FIGS. 7a and 7b.

In the fifth and sixth embodiment of the invention, the rotor poles 19 are parallel to each other and to the axis of the generator, while the stator poles 14'' are slanted a small angle to the axial direction, substantially as shown in FIG. 3. The function of the generator is not changed, if the rotor poles 19 are slanted to the axial direction, and the stator poles 14'' extend in axial direction.

Figure 9:
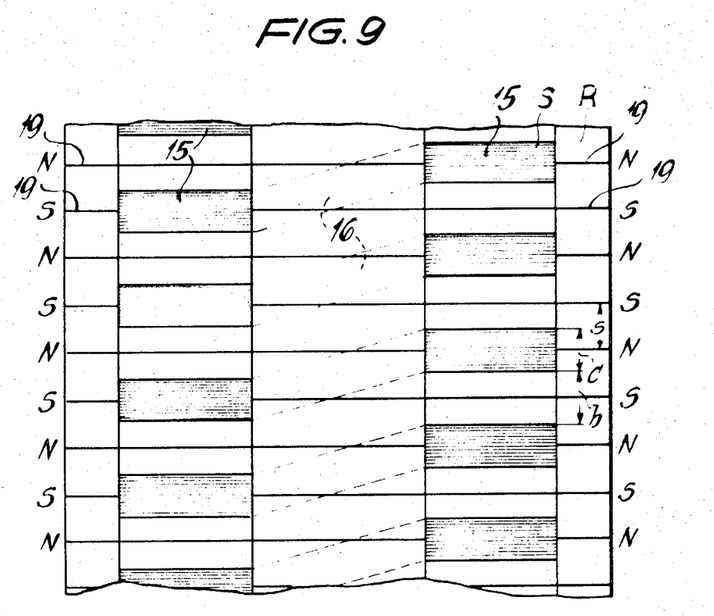
FIG. 9 is a diagrammatic developed view illustrating the relative position between modified rotor poles and the stator poles of the fifth and sixth embodiments.

FIG. 9 diagrammatically illustrates a modified construction of the stator pole 14 which are U-shaped and have legs 15 parallel to the axial direction and to the axially extending rotor poles 19. However, the two legs 15 of each stator pole 14 are staggered so that one leg of each pair cooperates with a south pole, and the other leg co-operates with a north pole of the rotor poles 19, while the yoke portion 16 is slanted. The two legs 15 of each stator pole 14 are staggered in axial direction the distance s which represents the distance between two rotor poles. This construction of the U-shaped stator poles 14, permits the use of somewhat thicker sheets, as in the embodiments of FIGS. 4a, 4b and 5a, 5b, so that the magnetic resistance of the air gap 20 between rotor and stator is reduced, and the output voltage of the stator winding 17 is increased.

The annular supporting body 13 is the main support of the stator, and can be made of a thermosetting synthetic plastic. Other synthetic plastics which can be pressed, injection molded, or machined, can also be used for the supporting body 13. It is advantageous to use such a mold that the supporting body 13 is provided with the grooves in which the stator pole sheets 14 are respectively mounted. For different embodiments of the generator, different injection molds are used for making the supporting body 13. Such injection molds can be manufactured at a substantially lower cost than stamping tools, which are required for manufacturing conventional stators consisting of steel sheets.

U-shaped or L-shaped stator pole sheets can be used irrespective of whether the rotor is located inside or outside of the stator. The final shape of the stator is obtained after mounting of the stator pole sheets 14, by embedding the stator poles in synthetic resin, or in thermoplastic synthetic material.

In all embodiments of the invention, it is advantageous to use ferrite bonded by a synthetic plastic material as a permanently magnetic material for the rotor. Bonded ferrite is available in the trade in the form of bands, and such a band can be simply adhesively attached or vulcanized to the rotor surface confronting the stator, and then provided with rotor poles of alternating polarity by means of a suitable magnetizing apparatus. The annular rotor support to which the band is attached, preferably consists of a temporarily magnetizable material, and serves as a magnetic connection. It is advantageous to make the thickness of the ferrite band substantially equal to half the distance $s$ between two rotor poles 19.

Although the mass of the magnetizable iron in the stator poles is substantially smaller than in conventional alternating current generators, the shape of the magnetic field lines about the circular stator winding 17 is closer to the ideal circular shape, than in known generators, since the stator poles 14 are operating individually and are magnetically insulated from each other. The magnetic field lines flow through the axially extending rotor poles 19 and the slanted stator poles 14 in the form of slanted circles surrounding the stator poles 14. The slant of the circles of the magnetic field lines, and thereby the longitudinal component of the magnetic field intensity which have no effect on the induction, becomes smaller for a greater number of poles. Rotary speed transmitters for transfer blocking systems must have as many poles as possible, so that the shape of the magnetic field is particularly favorable in the generator of the present invention. The described embodiments may have 192 rotor poles 19.

Tests have proven that the maximum output voltage is obtained when the ratio between the distance $b$ between two stator poles and the distance $c$ representing the circumferential thickness of the stator poles, see FIGS. 3, 6 and 9, is greater than 1.2, since at this ratio the flux variations are greatest. The circumferential width of the rotor poles 19 is very small and is about 0.2 to 0.3 mm in the above-described embodiments of the invention.

In mass production, it can hardly be avoided that the rotor has a small eccentricity of 0.1 to 0.2 mm. This eccentricity becomes noticeable in the form of an amplitude modulation of the output voltage at the conductors 18, the modulating voltage depending upon the amount of eccentricity. The amplitude of the output voltage is inversely proportional to the width of the air gap 20. In order to obtain a least modulated output voltage, the width of air gap 20 must be made as small as permitted by the eccentricity of the rotor caused by acceptable tolerances. The width of air gap 20 should not exceed half of the thickness of the stator pole sheets 14.

The holding ring 20 of the embodiments of FIGS. 7a, 7b and 8a, 8b preferably does not consist of ferromagnetic material, so that the path of the magnetic flux lines about the stator poles 14 is not disturbed. If the holding ring consists of a ferromagnetic material hysteresis losses, and eddy current losses become greater, and are as high as in the embodiments of FIGS. 4a, 4b and FIGS. 5a, 5b. If the thus caused reduction of the output voltage is not objectionable, the holding ring 22 may be made of steel in order to reduce manufacturing cost.

It will be understood that each of the elements described above, or two or more together, may also find a useful application in other types of alternating current generators differing from the types described above.

While the invention has been illustrated and described as embodied in an alternating current generator with U-shaped stator poles having axially and circumferentially spaced end portions cooperating with the rotor poles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Alternating current generator with radial stator poles comprising a rotor having a circumferential circular rotor surface made of a permanently magnetic material and forming circumferentially alternating magnetic rotor poles of opposite polarity; and a stator including a circular supporting body, an annular winding, and a circular row of stator poles mounted on said circular supporting body radially projecting toward said rotor surface, each stator pole consisting of a magnetizable material and having two end portions spaced in axial direction and respectively located opposite two rotor poles of opposite polarity.

2. Generator as claimed in claim 1 wherein said stator is located within said rotor; and wherein said rotor surface and said circular row of stator poles are concentric.

3. Generator as claimed in claim 1 wherein said rotor is located within said stator; and wherein said rotor surface and said circular row of stator poles are concentric.

4. Generator as claimed in claim 1 wherein said end portions of each stator pole are located opposite adjacent rotor poles of opposite polarity, respectively.

5. Generator as claimed in claim 4 wherein said stator poles are U-shaped and have a pair of legs projecting toward said rotor surface, the legs of each pair having said end portions which are, respectively, located opposite two rotor poles of opposite polarity.

6. Generator as claimed in claim 4 wherein said stator poles are flat U-shaped sheets, each U-shaped sheet having a yoke and a pair of legs projecting toward said rotor surface, the legs of each pair having said end portions which are, respectively, located opposite two rotor poles of opposite polarity; wherein said supporting body has parallel grooves arranged in a circumferential row; and wherein said U-shaped sheets are mounted in said grooves.

7. Generator as claimed in claim 4 wherein said rotor poles are circumferentially narrow and extend in axial direction; and wherein said stator poles are circumferentially narrow and extend at a small angle to said rotor poles.

8. Generator as claimed in claim 7 wherein the tangent of said angle is equal to the circumferential distance between adjacent rotor poles divided by the mean circumferential distance between said end portions of a stator pole.

9. Generator as claimed in claim 4 wherein said stator poles are circumferentially narrow and extend in axial direction; and wherein said rotor poles are circumferentially narrow and extend at a small angle to said stator poles.

10. Generator as claimed in claim 9 wherein the tangent of said angle is equal to the circumferential distance between adjacent rotor poles divided by the mean circumferential distance between said end portions of a stator pole.

11. Generator as claimed in claim 4 wherein said stator poles and rotor poles are circumferentially narrow and extend in axial direction; and wherein said end portions of each stator pole are circumferentially spaced so as to be located opposite adjacent rotor poles.

12. Generator as claimed in claim 4 wherein each stator pole is composed of a pair of flat substantially L-shaped sheets, the thickness of each sheet being substantially equal to the circumferential distance between two adjacent rotor poles, each sheet having a longer leg and a shorter leg, the shorter leg of each sheet registering with the longer leg of the respective other sheet, and the longer legs of each pair of sheets having said end portions located opposite two rotor poles of opposite polarity.

13. Generator as claimed in claim 4 wherein said stator poles are U-shaped and have legs projecting toward said rotor surface; wherein said legs have said end portions; and wherein said end portions are larger than the remaining portions of said legs for reducing the magnetic resistance in the gap between said rotor surface and said stator poles.

14. Generator as claimed in claim 4 wherein said circular supporting body consists of a thermosetting synthetic plastic material, and has a circumferential row of grooves in which said stator poles are mounted, respectively, insulated from each other.

15. Generator as claimed in claim 14 wherein said supporting body has two lateral annular surfaces formed with said grooves, said grooves extending in radial direction so that said stator poles can be mounted in said grooves with said end portions projecting radially inward or radially outward.

16. Generator as claimed in claim 14 wherein said stator includes a thermosetting plastic material partly embedding said stator poles so that only said end portions are free.

17. Generator as claimed in claim 14 wherein said stator includes an annular holding ring located on said stator poles remote from said end portions and said rotor surface for mechanically reinforcing said stator.

18. Generator as claimed in claim 17 wherein said holding ring consists of an electrically conductive material and is adapted to ground said stator.

19. Generator as claimed in claim 14 wherein said annular winding includes wires, and silicon caoutchouc between said wires.

20. Generator as claimed in claim 1 wherein said rotor includes an annular support, and a band attached to said annular support and forming a cylindrical ring having said rotor surface; and wherein said band consists of a permanently magnetizable material and of a bonding substance bonding said material.

21. Generator as claimed in claim 1 wherein said stator poles are U-shaped and together form an annular space open toward said rotor surface; and wherein said winding is located within said annular space.

22. Generator as claimed in claim 21 wherein said supporting body has a U-shaped cross section, is located in said annular space, and forms another annular space in which said winding is located.

23. Generator as claimed in claim 21 wherein said winding is located in said annular space abutting said U-shaped stator poles; and wherein said supporting body has a circular row of grooves mounting the yoke portions of said U-shaped stator poles.

* * * * *